United States Patent
Kristiansen

(10) Patent No.: US 7,981,232 B2
(45) Date of Patent: Jul. 19, 2011

(54) METHOD FOR MANUFACTURING A FILTRATION DEVICE

(76) Inventor: Jan Ingolf Kristiansen, Asker (NO)

( * ) Notice: Subject to any disclaimer, the term of this patent is extended or adjusted under 35 U.S.C. 154(b) by 515 days.

(21) Appl. No.: 11/997,414

(22) PCT Filed: Aug. 1, 2005

(86) PCT No.: PCT/NO2005/000285
§ 371 (c)(1),
(2), (4) Date: Feb. 19, 2008

(87) PCT Pub. No.: WO2007/015643
PCT Pub. Date: Feb. 8, 2007

(65) Prior Publication Data
US 2009/0199958 A1    Aug. 13, 2009

(51) Int. Cl.
*B65H 54/02* (2006.01)
*B01D 39/16* (2006.01)
*B65D 55/04* (2006.01)
*D02G 3/04* (2006.01)

(52) U.S. Cl. ............... 156/172; 156/169; 210/457

(58) Field of Classification Search ............ 156/169, 156/172; 210/457
See application file for complete search history.

(56) References Cited

U.S. PATENT DOCUMENTS

| 3,828,934 | A | * | 8/1974 | Green et al. | 210/457 |
| 4,761,231 | A |   | 8/1988 | Tomita et al. |  |
| 5,092,351 | A | * | 3/1992 | Itoh | 131/340 |
| 5,552,065 | A |   | 9/1996 | Meddock et al. |  |
| 5,679,251 | A | * | 10/1997 | Swanson et al. | 210/457 |
| 5,772,952 | A |   | 6/1998 | Allen et al. |  |
| 2008/0073299 | A1 | * | 3/2008 | Meddock et al. | 210/457 |

FOREIGN PATENT DOCUMENTS

EP  0 489 157 A  6/1992
FR  2 097 502     3/1972

* cited by examiner

*Primary Examiner* — Jeff H Aftergut
(74) *Attorney, Agent, or Firm* — Frommer Lawrence & Haug LLP; Ronald R Santucci

(57) ABSTRACT

Method for winding textile threads to filter bobbins for filtration purposes of petrochemicals, by, in a first operation, winding 4 layers laid at 30 degrees both ways, in a second operation winding 5 layers laid at 40 degrees both ways, in a third operation winding 9 layers laid at 35 degrees both ways, in a fourth and last operation winding 12 layers laid at 15 degrees one way and just with 50 degree transfer back for each layer, and repeating the first, second, third and fourth operations, the threads used thereby comprising 58% cotton, 16% acryl, 11.5% flax, 11.5% polyester, 2% polyamide, 0.6% acetate and 0.4 % viscose.

1 Claim, No Drawings

METHOD FOR MANUFACTURING A FILTRATION DEVICE

This is a 371 filing of International Patent Application No. PCT/NO2005/000285 filed Aug. 1, 2005 and published on Feb. 8, 2007 under publication number WO 2007/015643.

The present invention is related to a method for manufacturing a filtration device for purifying fluids for particulate contaminations.

The automotive industries have problems with particle contaminations of petrochemical products for lubrication and different power transmissions such as hydraulics, gears, valves, etc. These contaminations cause especially problems in the range between 0.5 µm-30 µm where normal full flow filters made of paper or cellulose does not work or are very expensive.

It therefore is an object to provide a filter especially for contaminated oil products. This object is fulfilled with the filter according to the present invention as defined by the features stated in the patent claims.

The filter according to the invention is made of a special textile yarn with a special mixture of different textiles, natural and synthetics, and winding this as a bobbin with a certain controlled hardness resistance combined with certain winding angles and patterns. The filter has a hollow and perforated cylinder formed hard core made of metal or composite synthetic materials that the textile yarn is wound around.

These combinations of textiles and winding pattern can be regulated in a way that the filter can be made to trap particles from a chosen size and upwards.

The bobbin like is made so that the cylinder formed core is placed horizontally and the yarn is wound on at angle based on the vertical axis.

On the cylindrical perforated metal core is wound a piece of tightly woven textile that cover the core one time. Thereafter the yarn is wound on.

The filter is wound so that the filtered liquid media under a certain flow pressure will meet harder and lesser resistance in intervals when passing through the filtration media.

This effect is obtained by changing the winding resistance (hardness) and winding angles. Loose and hard windings may be varied and alternating as is the different winding angles during the winding process.

The following pattern is typical for the manufacturing method according to the present invention comprising four operations.

In a first operation 4 layers are laid at 30 degrees both ways, in a second operation 5 layers are laid at 40 degrees both ways, in a third operation 9 layers are laid at 35 degrees both ways, in a fourth and last operation 12 layers are laid at 15 degrees one way and just with 50 degree transfer back for each layer.

Thereafter the operations one to four are repeated with same pattern.

The winding is done in a bobbin winding machine equipped with special controls and regulators for the purpose.

By using certain different textile materials and fibers the filtration effect can be varied when mixing the textiles, as different fibers and textiles have different capability to trap and hold on to particles.

The following specifications for textile mixture in the filter for petrochemicals have proved efficient and are preferred:

| | |
|---|---|
| Cotton | 58.00% |
| Acryl | 16.00% |
| Flax | 11.50% |
| Polyester | 11.50% |
| Polyamide | 2.00% |
| Acetate | 0.60% |
| Viscose | 0.40% |

The above mentioned wounded textile filters (bobbins) mounted in a thin metal can or tin represent a unique product for filtration purposes. Also unique is the filter according to the invention installed in a can. The filter as such is put into a tin can sized up to the filter and closed. This means that a filter house is not needed, as the can serves as the housing, that will be screwed on a distillation chamber. The filter and the filter housing are presented as one unit.

In relation to prior art filter solutions the present invention provides a filter solution at a low price, especially compared to the unique performance both in its fine filtration quality and the extreme large amount of trapped particles it can hold. For the user the filter according to the invention is easy to handle, to install and to replace as it comprises less parts as conventional filters, namely only one part.

The filter according to the present invention has proven to have a big filtration capacity compared with all other known filters.

The invention claimed is:

1. Method for winding textile threads to filter bobbins for filtration purposes of petrochemicals, characterized by winding onto a hollow and perforated cylinder core, in a first operation, 4 layers laid at 30 degrees both ways, in a second operation, winding 5 layers laid at 40 degrees both ways, in a third operation, winding 9 layers laid at 35 degrees both ways, in a fourth and last operation, winding 12 layers laid at 15 degrees one way and just with 50 degree transfer back for each layer, and repeating the first, second, third and fourth operations, the threads used thereby comprising 58% cotton fibres, 16% acrylic fibres, 11.5% flax fibres, 11.5% polyester fibres, 2% polyamide fibres, 0.6% cellulose acetate fibres and 0.4% viscose fibres.

* * * * *